3,198,799
DERIVATIVES OF PIPERAZINOMETHYL-
SALICYLIC ACID
Gilbert L. Regnier, Sceaux, Seine, and Roger J. Canevari, l'Hay-les-Roses, Seine, France, assignors to Société en nom collectif dite: "Science Union et cie Societe Francaise de Recherche Medicale," a corporation of France
No Drawing. Filed Apr. 12, 1963, Ser. No. 272,539
Claims priority, application Great Britain, Apr. 12, 1962, 14,206/62; Aug. 7, 1962, 30,180/62
6 Claims. (Cl. 260—268)

The present invention relates to novel derivatives of salicylic acid of general formula:

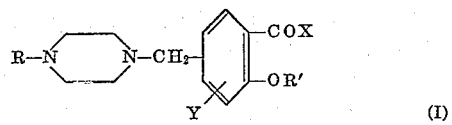

in which:
(a) R represents a substituent selected within the group consisting of:
  A hydrogen atom, a group such as formyl, acetyl, carbethoxy and carbobenzoxy

—COO—CH$_2$—C$_6$—H$_5$

A phenyl radical,
  A phenyl radical substituted by a halogen atom, a trifluoromethyl radical, a lower alkyl radical up to C$_5$, a lower alkoxy radical up to C$_5$, a methylene dioxy group, a nitro group and an amino group.
(b) R' represents a hydrogen atom, an acetyl group, a lower alkyl radical up to C$_5$, a lower alkylene radical up to C$_5$.
(c) Y represents a hydrogen atom, a hydroxyl radical OH and a methyl radical —CH$_3$.
(d) X represents a hydroxyl radical OH, a lower alkoxy group up to C$_5$.

These derivatives may be prepared from a derivative of formula:

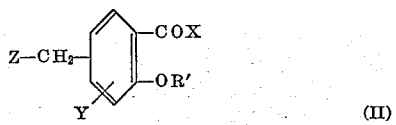

in which Z represents a halogen atom, R', Y and X having the same specifications as above, by condensation on an N-monosubstituted piperazine of formula:

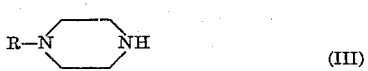

in which R has the same specification as above, the reaction being carried out
  in a solvent such as aromatic hydrocarbon, and an alcohol of low molecular weight,
  at the boiling temperature of the selected solvent (60° C. to 135° C.), and
  in the presence of an alkaline agent, acceptor of hydracid such as K$_2$CO$_3$, triethylamine and an excess of the N-monosubstituted piperazine.

According to one preparation variant of the compounds, defined above, a particularly advantageous variant for compounds in which R'=H and Y=OH or —CH$_3$, the corresponding salicylic acid, methyl salicylic or dihydroxy benzoic acid of formula:

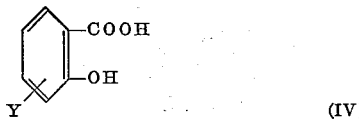

is condensed on the appropriate substituted piperazine, in the presence of formol, the reaction being carried out by dissolving the piperazine in question in a polar solvent such as, notably, an alcohol of low molecular weight, by adding an aqueous solution of formol in equi-molecular proportion and substituted salicylic acid, preferably greatly in excess (50 to 200%), so as to minimise secondary reactions, in particular the di-substitution of the acid considered.

The reaction is carried out over a period of 1 to 5 days at ambiant temperature but may, in certain cases, be accelerated by slight heating up to a maximum of 50° C.

The compounds obtained, according to the invention, are subsequently:
In the case where Y=H: derivatives of salicylic acid and its esters,
In the case where Y=CH$_3$: derivatives of ortho and meta cresotinic acid, 6-methyl salicylic/and their esters.
In the case where Y=OH: derivatives of gentisic acids (2,5-dihydroxy benzoic acid), β and γ-resorcylics (2,4- and 2,6-dihydroxy benzoic acids) pyrocatechic (2,3-dihydroxy benzoic acid) and their esters.

It may be seen that the postion of the residue

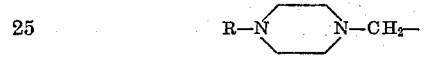

in the above general formula is governed by the position and the nature of the substituent Y on the benzene radical. Effectively, If Y=H, substitution of the benzene radical of the salicylic acid by the residue

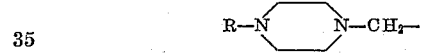

may be carried out in positions: 3, 4, 5 or 6 (Belstein's numeration),
If Y=CH$_3$ (in the case of o and m-cresotinic and of 6-methyl salicylic acids), substitution of the benzene radical may only be carried out in position 3 or 5,
If Y=OH (case of 2,3 2,4 2,5 and 2,6-dihydroxybenzoic acids), substitution of the benzene radical may only be carried out in position 3 or 5.

The invention will be better understood through the following examples, which are non-limitative.

In these examples, the temperatures are given in degrees Celsius. The melting points were determined by means of the Kofler heating microplatinum.

These novel derivatives may eventually be purified by physical methods such as: crystallization, distillation, chromatography, or chemical methods such as: formation of salts, crystallization of these latter and decomposition in an alkaline medium.

The addition salts of the compounds which are strong bases may be obtained by the action of the novel derivatives on acids in appropriate solvents; as organic solvents may be used alcohols, ethers, ketones; as inorganic solvent, water is used with advantage; as acids used for the formation of these addition salts, one may mention, in the inorganic range: hydrochloric, hydrobromic, sulphuric, methane-sulphonic, phosphoric acids and, in the organic range: acetic, maleic, fumaric, oxalic, tartric citric, benzoic, etc., acids.

Finally, certain of these compounds being esters and acids, it is easy to pass from the ester to the corresponding acid by hydrolysis and, reciprocally, from the acid to the corresponding ester by esterification: for example, the hydrolysis of 7.8 g. of 1-(2'-methoxy phenyl) 4-(3'-acetoxy 4'-carbomethoxy benzyl) piperazine by boiling for one hour in 37 cc. of 4% hydrochloric acid produces, after crystallization in water, 6.8 g. of 1-(2'''-methoxy phenyl) 4(3'-hydroxy 4'-carbomethoxy benzyl) piperazine dihydrochloride melting at 215–217°. Yield: 80%.

EXAMPLE 1

*1-(4'-hydroxy 3'-carbomethoxy benzyl) 4-carbobenzoxy piperazine*

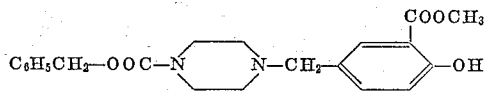

To a solution of 60 g. of carbobenzoxy piperazine in 300 cc. of anhydrous toluene containing 27.5 g. of triethylamine, one adds in 5 minutes at 60°, 65.7 g. of 3-carbomethoxy 4-hydroxy benzyl chloride melting at 60°. The mixture is then maintained at reflux for 5 hours.

At the end of this time, it is cooled and 700 cc. of water added to dissolve the precipitated triethylamine hydrochloride; the toluene solutions are then decanted and extracted several times with 10% methane sulphonic acid. The acid solutions are combined and washed in ether. Then, one alkalinizes with potassium carbonate and extracts the oily base with chloroform. After drying on anhydrous potassium carbonate and evaporation of the solvent, one obtains 80 g. of base at 99% of the theory and of which the acid oxalate prepared within ethanol melts at 172°.

The basic 3-carbomethoxy 4-hydroxy benzyl chloride (B.P/$_{0.9}$=126°, M.P.=63–65°) was prepared by chloromethylation of methyl salicylate in hydrochloric acid, in the presence of methylal according to German patent, Bayer, No. 113,723, dated January 15, 1899.

The following compounds have been prepared by the same process:

(*a*) 1-(4'-hydroxy 3'-carboxy benzyl) 4-carbobenzoxy piperazine

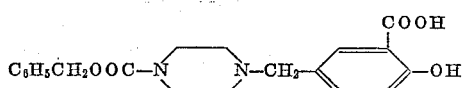

by using 3-carboxy 4-hydroxy benzyl chloride (M.P.=170°) prepared by chloromethylation of salicylic acid according to the process described in Example 1. Yield: 90%. The base melts at 141–145° (with decomposition).

(*b*) 1-(4'hydroxy 3'-carbomethoxy benzyl) 4-formyl piperazine

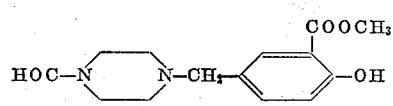

according to Example 1, starting with 4-formyl piperazine.

(*c*) 1-(4'-hydroxy 3'-carbomethoxy benzyl) 4-(3''-methoxy phenyl) piperazine

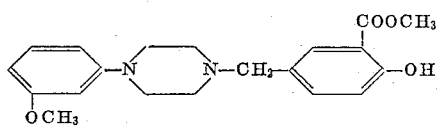

according to Example 1, from m-methyl phenyl piperazine. Yield 70%. The base melts at 80–82°. The dihydrochloride melts at 166–168° (decomposition).

The corresponding acid, 1-(4'-hydroxy 3'-carboxy benzyl) 4-(3''-methoxy phenyl) piperazine

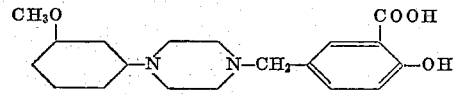

was prepared with a yield of 76%. The dihydrochloride melts at 155–163° with decomposition.

(*d*) 1-(4'-hydroxy 3'-carbomethoxy benzyl) 4-(4''-methoxy phenyl) piperazine

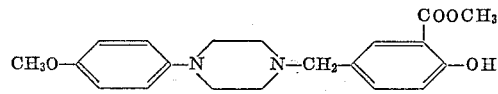

according to Example 1, from the p-methoxyphenyl piperazine. The yield: 80%. The base melts at 85–89°. The dihydrochloride melts at 160–165° (with decomposition).

The corresponding acid, 1-(4'-hydroxy 3'-carboxy benzyl) 4-(4''-methoxy phenyl) piperazine

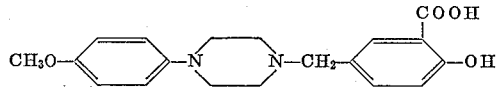

was prepared with a yield of 50%. The corresponding dihydrochloride melts at 150–153° (with decomposition).

(*e*) 1-(4'-hydroxy 3'-carbomethoxy benzyl) 4-(2''-methoxy phenyl) piperazine

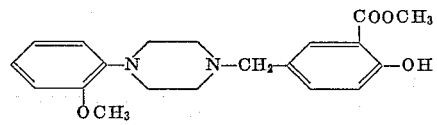

according to Example 1, from o-methoxy phenylpiperazine. Yield 42%. The base melts at 110–118°. The corresponding dihydrochloride melts at 165–171° (with decomposition).

The corresponding acid, 1-(4'-hydroxy 3'-carboxy benzyl) 4-(2''-methoxy phenyl) piperazine

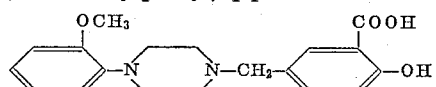

was prepared with a yield of 43%. The dihydrochloride melts at 169–172° (with decomposition).

(*f*) 1-(4'-hydroxy 3'-carbomethoxy benzyl) 4-(2''-chloro phenyl) piperazine

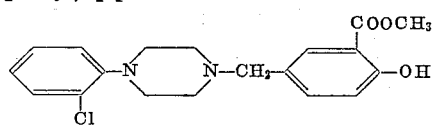

according to Example 1, from ortho chloro phenyl piperazine. Yield: 59%. The dihydrochloride melts at 119–122° with decomposition.

(*g*) 1-(4'-hydroxy 3'-carbomethoxy benzyl) 4-(2''-methyl phenyl) piperazine

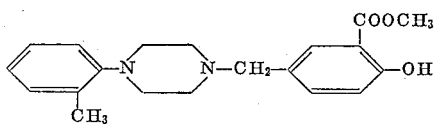

according to Example 1, from ortho tolyl piperazine. Yield 58%. The dihydrochloride melts at 174–184° with decomposition.

(*h*) 1-(4'-hydroxy 3'-carbomethoxy benzyl) 4-phenyl piperazine

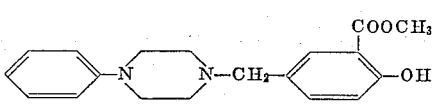

according to Example 1, from phenylpiperazine. Yield 90%. The dihydrochloride melts at 165–170° with decomposition.

(*i*) 1-(4'-hydroxy 3'-carbomethoxy benzyl) 4-(2''-ethoxy phenyl) piperazine

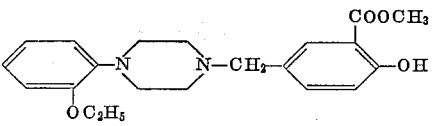

according to Example 1, from orthoethoxyphenyl-piperazine boiling at 130° at a pressure of 0.9 mm. of mercury. Yield: 70%. The dihydrochloride melts at 169–172° with decomposition.

(j) 1-(4'-ethoxy 3'-carbomethoxy benzyl) 4-(2"-methoxy phenyl) piperazine

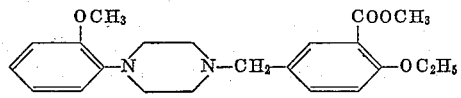

according to Example 1, from ortho-methoxy phenyl piperazine and (4-ethoxy 3-carbomethoxy benzyl) bromide, boiling at 140–146°, at a pressure of 0.5 mm. of mercury ($n_D^{20}$ 1.5645). The dihydrochloride melts at 201–203° with decomposition.

The corresponding acid 1(4'-ethoxy 3'-carboxy benzyl) 4-(2"-methoxy phenyl) piperazine

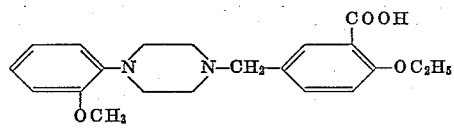

was prepared with a yield of 40%. The dihydrochloride melts at 143–146° (with decomposition).

(k) 1-(3'-acetoxy 4'-carbomethoxy benzyl)-4-(2"-methoxy phenyl) piperazine

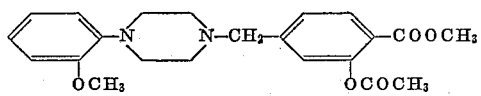

according to Example 1, from ortho methoxy phenyl piperazine and 3-acetoxy 4-carbomethoxy benzyl bromide. Yield: 54%. The dihydrochloride melts at 130°.

The basic bromated derivative (melting point 50°) was prepared by bromidation with the help of N-bromosuccinimide in $CCl_4$, in the presence of benzoyl peroxide of 2-acetoxy 4-methyl benzoate of methyl, boiling at 92–102°, under a pressure of 0.01 mm. of mercury, itself prepared by acetylation of methyl metacresotinate by acetic anhydride in acetic acid at 70°, in the presence of a trace of sulphuric acid.

(l) 1-(2'-hydroxy 3'-carbomethoxy benzyl) 4-(2"-methoxy phenyl) piperazine

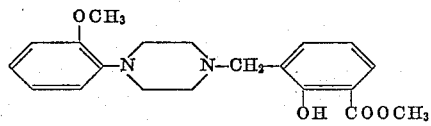

obtained by hydrolysis of the corresponding acetylated derivative, itself prepared from ortho methoxy-phenyl piperazine. Yield: 31%. The dihydrochloride melts at 151–156° with decomposition. The base melts at 114–117°.

The basic bromide of 2-acetoxy 3-carbomethoxy benzyl melting at 100° was prepared according to a similar process to that described in Example 1, from 3-methyl 2-acetoxy benzoate of methyl: M.P. 90–95° at 0.01 mm. ($n_D^{20}$ 1.5115).

(m) 1-(2'-hydroxy 4'-carbomethoxy benzyl) 4 - (2"-methoxy phenyl) piperazine

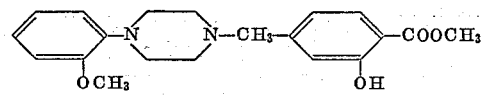

according to Example 1(k). Yield 80%. Melting point of the dihydrochloride 215–217° (by hydrolysis of compound k).

(n) 1-(2', 5'-dihydroxy 3'-carboxy benzyl) 4-(2"-methoxy phenyl) piperazine

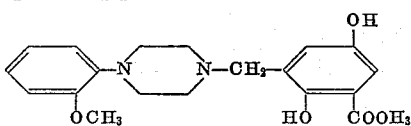

prepared from 1-(2'-methoxy phenyl) piperazine and 2,5-diacetoxy 3-carbomethoxy benzyl chloride. Yield: 67%. The base melts at 217–225°.

The hydrochloride melts at 200–205° (with decomposition).

The corresponding ester, 1-(2,5-dihydroxy 3-carbomethoxy benzyl) 4-(2"-methoxy phenyl) piperazine

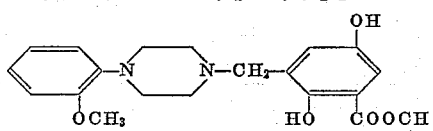

was prepared with a similar yield. Its dihydrochloride melts at 250–255°.

(o) 1-(2',5'-dihydroxy 3'-carboxy benzyl) 4-formyl piperazine

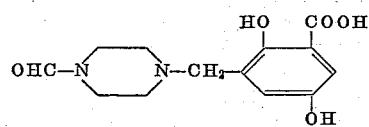

was prepared from formyl piperazine and the corresponding chloride.

(p) 1-(3'-methyl 4'-hydroxy 5'-carbomethoxy benzyl) 4-(2"-methoxy phenyl) piperazine

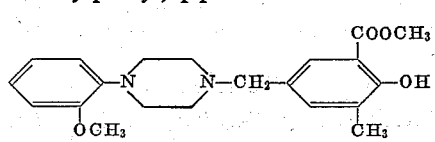

was prepared from 3-methyl 4-hydroxy 5-carbomethoxy benzyl chloride. The dihydrochloride melts at 140–150° (with decomposition).

The corresponding acid, 1-(3'-methyl 4'-hydroxy 5'-carboxy benzyl) 4-(2"methoxy phenyl) piperazine

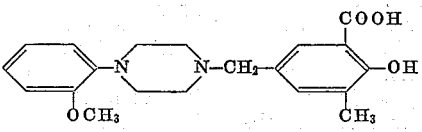

was obtained with a yield of 50%. The dihydrochloride melts at 164–167° (decomposition).

(q) 1-(2'-methyl 4'-hydroxy 5'-carbomethoxy benzyl) 4-(2"-methoxy phenyl) piperazine

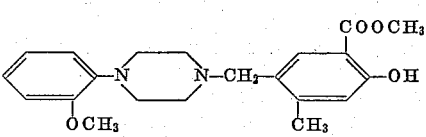

was prepared from 2-methyl 4-hydroxy 5-carbomethoxy benzyl chloride with a yield of 30%. The dihydrochloride melts at 167–177° (with decomposition).

The corresponding acid, 1-(2'-methyl 4'-hydroxy 5'-carboxy benzyl) 4-(2"methoxy phenyl) piperazine

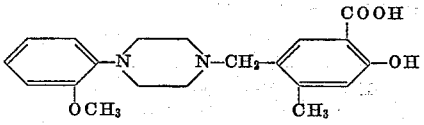

was obtained with a similar yield. The dihydrochloride melts at 154–162° (with decomposition).

(r) 1-(2'-methyl 3'-carboxy 4'-hydroxy benzyl) 4-(2''-methoxy phenyl) piperazine

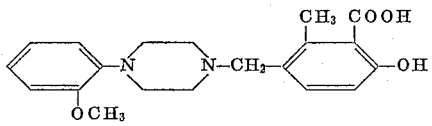

by hydrolysis of the corresponding ester, itself obtained from 2-methyl 3-carbomethoxy 4-hydroxy benzyl chloride, with a yield of 40%. The dihydrochloride melts at 193–195° (with decomposition).

(s) 1-(2',4'-dihydroxy 3'-carboxy benzyl) 4-(2''-methoxy phenyl) piperazine

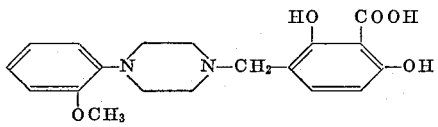

by hydrolysis of the corresponding ester, itself obtained from 2,4-dihydroxy 3-carbomethoxy benzyl chloride. The dihydrochloride melts at 158–164° (with decomposition).

(t) 1-(2',4'-dihydroxy 5'-carboxy benzyl) 4-(2''-methoxy phenyl) piperazine

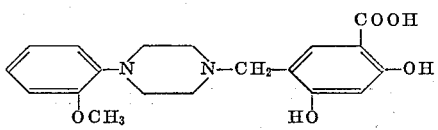

by hydrolysis of the corresponding ester, itself obtained from 2,4-dihydroxy 5-carbomethoxy benzyl chloride. The dihydrochloride melts at 170–176° (with decomposition).

EXAMPLE 2

*1-(3'-carbomethoxy 4'-hydroxy benzyl) piperazine*

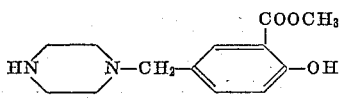

To a suspension of 17 g. of piperazine hexahydrate in 100 cc. of methanol, 7.4 cc. of concentrated hydrochloric acid (d.=1.19) are added so as to form piperazine monohydrochloride; this formation is accompanied by dissolution. To the solution obtained 9 g. of 3-carbomethoxy 4-hydroxy benzyl chloride at 70° are added in 5 minutes, then the mixture heated for one hour at 70°; an abundant precipitate of piperazine dihydrochloride is formed.

This is then cooled, the salt filtered and the solvent extracted under reduced pressure; the oily residue obtained is acidified to pH 2, with 20% hydrochloric acid; the solution is extracted several times with ether and strongly alkalized with potassium carbonate. The saturated alkaline solution is extracted several times with chloroform, and the chloroform dried on anhydrous $K_2CO_3$. After evaporation of the solvent under low pressure, 8.75 g. of crude oily base are obtained, whose dihydrochloride prepared within isopropanol crystallized in hydrated form.

With 0.5 molecule of water, it melts at 165–171° (with decomposition), with 1 molecule of water, it melts at 180–185° (with decomposition). Yield: 62%.

The corresponding butyl ester, 1-(3'-carbobutoxy 4'-hydroxy benzyl) piperazine

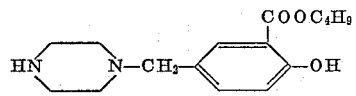

was prepared with a yield of 40%. The dihydrochloride melts at 160–166° (with decomposition).

The corresponding acid, 1-(3'-carboxy 4'-hydroxy benzyl) piperazine

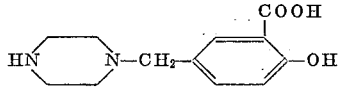

was prepared with a yield of 61%. The dihydrochloride melts at 205–210° (with decomposition).

The following compounds were prepared by the same process: (a) 1-(2'-hydroxy 3'-carbomethoxy benzyl) piperazine

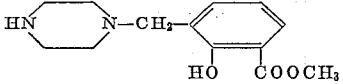

from piperazine hexahydrate and 2-acetoxy 3-carbomethoxy benzyl bromide. Yield: 30%.

The dihydrochloride melts at 173–183° (with decomposition).

(b) 1-(3'-hydroxy 4'-carbomethoxy benzyl) piperazine

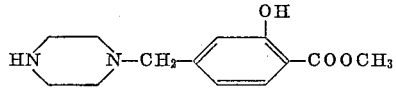

from piperazine hexahydrate and 3-acetoxy 4-carbomethoxy benzyl bromide. Yield: 27%.

The dihydrochloride melts at 180–185° (with decomposition).

(c) 1-(3'-carbomethoxy 4'-ethoxy benzyl) piperazine

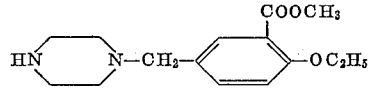

from piperazine hexahydrate and 4-ethoxy 3-carbomethoxy benzyl bromide. Yield: 42%.

The dihydrochloride melts at 180–192° (with decomposition).

EXAMPLE 3

*1-(3'-carbomethoxy 4'-acetoxy benzyl) piperazine*

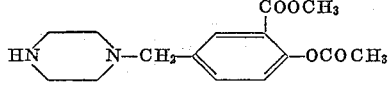

To solution of 25 g. of anhydrous piperazine in 750 cc. of dry benzene, a solution of 23.5 g. of (3-carbomethoxy 4-acetoxy) benzyl chloride in 100 cc. of dry benzene is added in 10 minutes at a temperature of 16°. An abundant precipitate forms; it is left to react for 3 hours at ambient temperature. At the end of this time, the crystals of piperazine hydrochloride formed are filtered, the benzene solution is washed in water, then extracted several times with 10% methane sulphonic acid at a temperature of 10°. The acid solution, washed in ether, is then alkalized with $K_2CO_3$ and the alkaline solution extracted several times with ether. After drying the ether on $K_2CO_3$ and evaporation of the solvent under low pressure, 11 g. of crude oily base are obtained whose dihydrochloride prepared within ethanol melts at 212° (with decomposition).

The initial chloride (B.P.$_{0.8\ mm.}$ 140–146°, $$n_D^{25}=1.5292$$

was prepared by acetylation of (3-carbomethoxy 4-hydroxy) benzyl chloride by acetic anhydride, in the presence of sulphuric acid, at 70°.

EXAMPLE 4

*1-(2',5'-dihydroxy 3'-carboxy benzyl) 4-(2''-methoxy phenyl) piperazine*

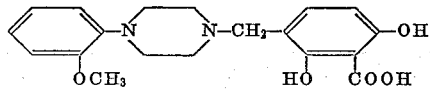

To a solution of 5.82 g. of 1-(2'-methoxy phenyl) piperazine and 14 g. of gentisic acid in 100 cc. of ethanol, 2.5 cc. of 40% formol are added and the mixture left to rest for 5 days in a dark place. At the end of this time, the crystals formed are squeezed dry; 12.1 g. of crude base are thus isolated, melting at 217–225°.

By formation of the dihydrochloride within isopropanol, one finally obtains 8.8 g. of white crystals of 1-(2″-methoxy phenyl) 4-(2′,5′-dihydroxy 3′-carboxy benzyl) piperazine, melting at 200–205° with decomposition. Yield: 67%.

The corresponding methylic ester

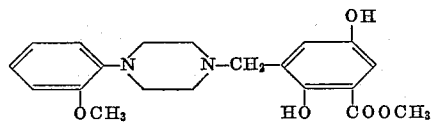

is obtained by esterification of the preceding compound by methanol in the presence of sulphuric acid. Its dihydrochloride melts at 250–255° (ethanol at 90%).

The following compounds were prepared according to the foregoing process:

(a) 1-(3′-methyl 4′-hydroxy 5′-carboxy benzyl) 4-(2″-methoxy phenyl) piperazine

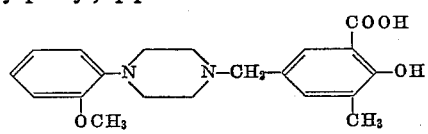

according to Example 4 by using orthocresotonic acid. Yield: 61%.

The dihydrochloride melts at 164–167° (with decomposition).

The corresponding methylic ester

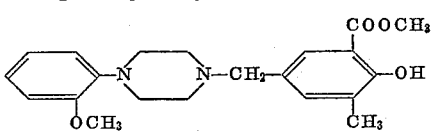

was prepared by esterification of the foregoing compound by methanol in the presence of $H_2SO_4$.

The dihydrochloride melts at 140–150° (with decomposition).

(b) 1-(2′-methyl 4′-hydroxy 5′-carboxy benzyl) 4-(2″-methoxy phenyl) piperazine

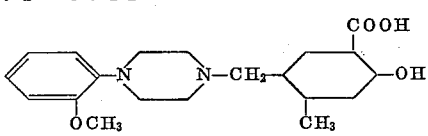

according to Example 4 using meta-cresotonic acid. Yield: 29%.

The dihydrochloride melts at 154–162° (with decomposition).

The corresponding methyl ester is:

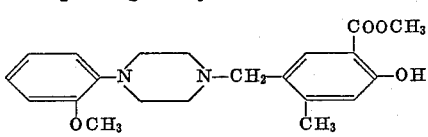

The dihydrochloride melts at 167–177° (with decomposition).

(c) 1-(6′-methyl 4′-hydroxy 5′-carboxy benzyl) 4-(2″-methoxy phenyl) piperazine

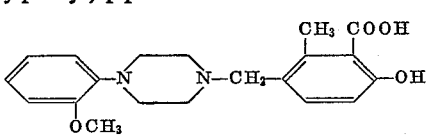

according to Example 4 by using 6-methyl salicylic acid. Yield: 77%.

The dihydrochloride melts at 193–195° (with decomposition).

(d) 1-(4′,6′-dihydroxy 5′-carboxy benzyl) 4-(2″-methoxy phenyl) piperazine

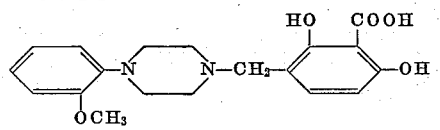

according to Example 4 by using γ-resorcylic acid. Yield: 45%.

The dihydrochloride melts at 158–164° (with decomposition).

(e) 1-(2′,4′-dihydroxy 5′-carboxy benzyl) 4-(2″-methoxy phenyl) piperazine

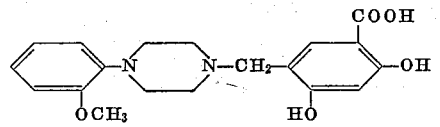

according to Example 4 by using β-resorcylic acid. Yield: 20%.

The dihydrochloride melts at 170–176° (with decomposition).

(f) 1-(2′,5′-dihydroxy 3′-carboxy benzyl) 4-formyl piperazine

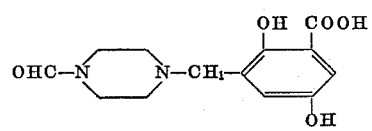

according to Example 4, by using formyl piperazine and gentisic acid. Yield: 70%.

By hydrolysis, is obtained:

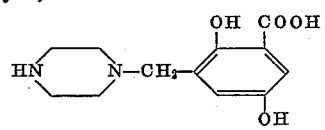

whose dihydrochloride melts at 225–235° with decomposition.

The derivatives obtained in accordance with the present invention are interesting for their remarkable pharmacological and therapeutical properties. In particular, their anti-inflammatory and analgesic action is important.

Tested on an oedema of a rat's paw, brought about by kaolin, the inflammation inhibiting action of certain of these derivatives reached 60% and, in equal doses, it is greater than that of phenylbutazone.

The analgesic action assessed by the heated plate method and expressed as a percentation of the increase in licking time with respect to check samples showed an increase of up to 100% for certain derivatives.

In addition, the toxicity of the products subjects of the invention being low: DL 50 by intraperitoneal means in the mouse varies between 218 and 789 mg./kg., the therapeutic margin is sufficiently large.

We claim:

1. A base having the formula:

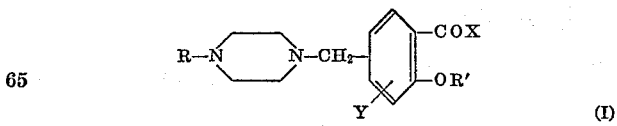

in which:

(a) R represents a substituent selected from within the group consisting of:
hydrogen atom, formyl, acetyl, carbethoxy and
—COO—$CH_2$—$C_6H_5$,
phenyl,
substituted phenyl wherein the only substituent is selected from the group consisting of halo, trifluoromethyl, lower alkyl up to $C_5$, lower alkoxy up to $C_5$, methylenedioxy, nitro and amino,
(b) R' represents a member of the group consisting of hydrogen atom, acetyl, and lower alkyl radical up to $C_5$,
(c) Y represents a member of the group consisting of a hydrogen atom, hydroxyl OH and methyl —$CH_3$,
(d) X represents a member of the group consisting of hydroxyl OH, lower alkoxy up to $C_5$, and the addition salt of said base with an acid.

2. 1 - (4' - hydroxy 3' - carbomethoxy benzyl) 4 - (2''-methoxy phenyl) piperazine.

3. 1-(2',4'-dihydroxy 5'-carboxy benzyl) 4-(2''-methoxy phenyl) piperazine.

4. 1-(4'-hydroxy 3'-carbomethoxy benzyl) 4-(3''-methoxy phenyl) piperazine.

5. 1-(4'-hydroxy 3'-carbomethoxy benzyl) 4 - (2''-chloropenyl) piperazine.

6. 1-(4'-hydroxy 3'-carbomethoxy benzyl) 4-(2'''-methyl phenyl) piperazine.

References Cited by the Examiner

UNITED STATES PATENTS 2,927,924    3/60    Mills _____ 260—268

OTHER REFERENCES

Surrey: Name Reactions in Organic Chemistry, pp. 118–120, Academic Press Inc., New York (1954).

NICHOLAS S. RIZZO, *Primary Examiner.*

UNITED STATES PATENT OFFICE
CERTIFICATE OF CORRECTION

Patent No. 3,198,799                                August 3, 1965

Gilbert L. Regnier et al.

It is hereby certified that error appears in the above numbered patent requiring correction and that the said Letters Patent should read as corrected below.

Column 3, lines 69 to 73, the formula should appear as shown below instead of as in the patent:

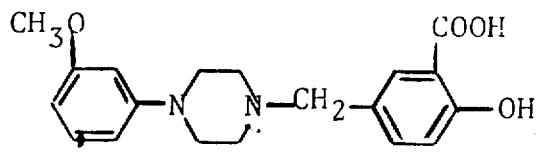

column 5, line 40, for "bromidation" read -- bromination --; line 65, for "1-(2'-" read -- 1-(3'- --; column 5, lines 68 to 71, the formula should appear as shown below instead of as in the patent:

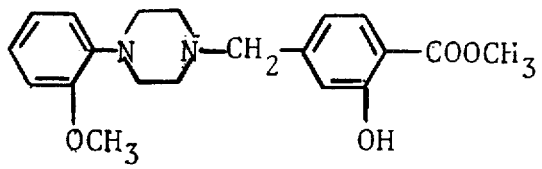

column 6, lines 3 to 7, lower right-hand portion of the formula, for that portion reading "COOH$_3$" read -- COOH --; lines 15 to 20, lower right-hand portion of the formula, for that portion reading "COOCH" read -- COOCH$_3$ --; column 8, lines 70 to 74, the formula should appear as shown below instead of as in the patent:

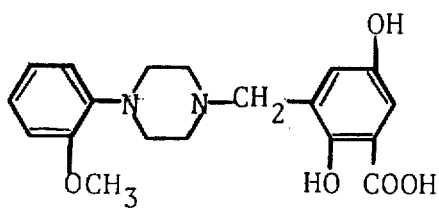

column 9, line 30, for "orthocresotonic" read -- orthocresotinic --; lines 47 to 51, the formula should appear as shown below instead of as in the patent:

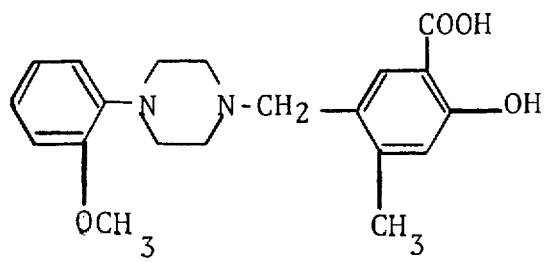

same column 9, line 53, for "meta-cresotonic" read -- meta-cresotinic --; column 12, line 2, for "chloropenyl)" read -- chlorophenyl) --.

Signed and sealed this 3rd day of May 1966.

(SEAL)
Attest:

ERNEST W. SWIDER
Attesting Officer

EDWARD J. BRENNER
Commissioner of Patents